United States Patent [19]

Fujii et al.

[11] 4,372,412

[45] Feb. 8, 1983

[54] VEHICLE INSTRUMENT PANEL ATTACHING STRUCTURE

[75] Inventors: Takayuki Fujii, Oimachi; Hitoshi Suda, Kamifukuoka, both of Japan

[73] Assignee: Honda Giken Kogyo Kabushiki Kaisha, Tokyo, Japan

[21] Appl. No.: 216,939

[22] Filed: Dec. 16, 1980

[30] Foreign Application Priority Data

Dec. 17, 1979 [JP] Japan .................... 54-174452[U]

[51] Int. Cl.³ ............................................. B60K 20/08
[52] U.S. Cl. ....................................... 180/90; 248/271
[58] Field of Search ...................... 180/90; D12/192; 248/271

[56] References Cited

U.S. PATENT DOCUMENTS 1,211,707 1/1917 Holmberg ............................. 180/90
3,341,248 9/1967 Barenyi ................................. 180/90
3,376,947 4/1968 Barenyi ................................. 180/90

Primary Examiner—Joseph F. Peters, Jr.
Assistant Examiner—John A. Carroll
Attorney, Agent, or Firm—Irving M. Weiner; Pamela S. Burt; John L. Shortley

[57] ABSTRACT

A vehicle instrument panel attaching structure wherein the instrument panel is attached to a body frame of the vehicle by means of stays which are disposed in side portions of the instrument panel so as to yieldably connect the instrument panel to the body frame of the vehicle. A predetermined clearance is defined between the instrument panel and the body frame of the vehicle in the assembled condition, so as to accommodate yielding movements of the stays. By virtue of the attaching structure, the instrument panel is yieldingly movable relative to the vehicle body frame when subjected to substantial impacts, thereby protecting a driver or a passenger from injury under unusual conditions such as during a collision of the vehicle.

8 Claims, 4 Drawing Figures

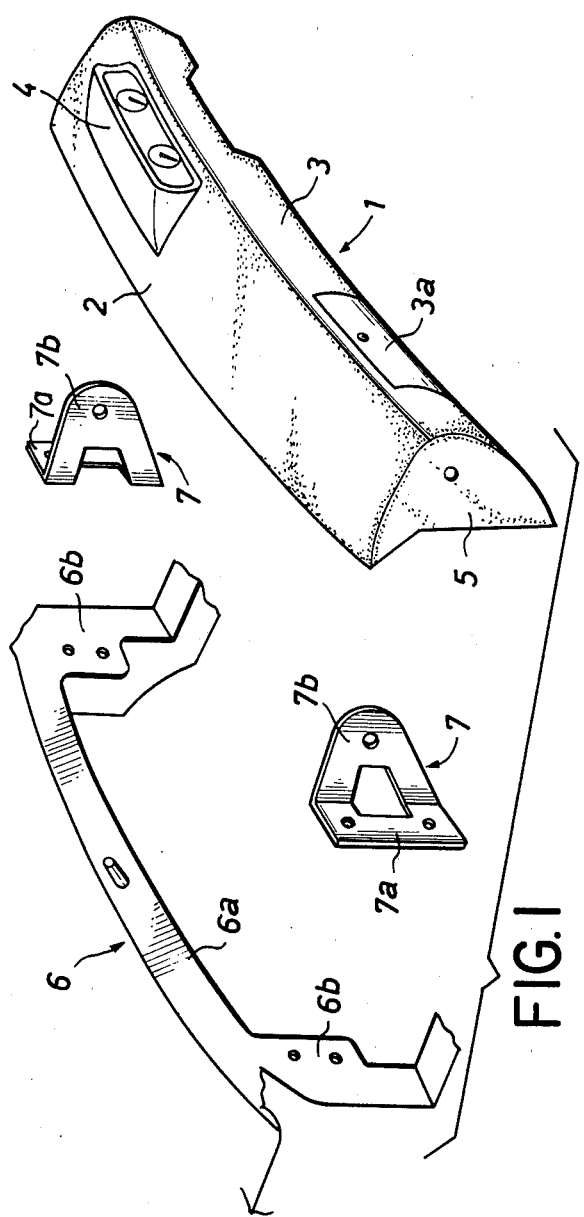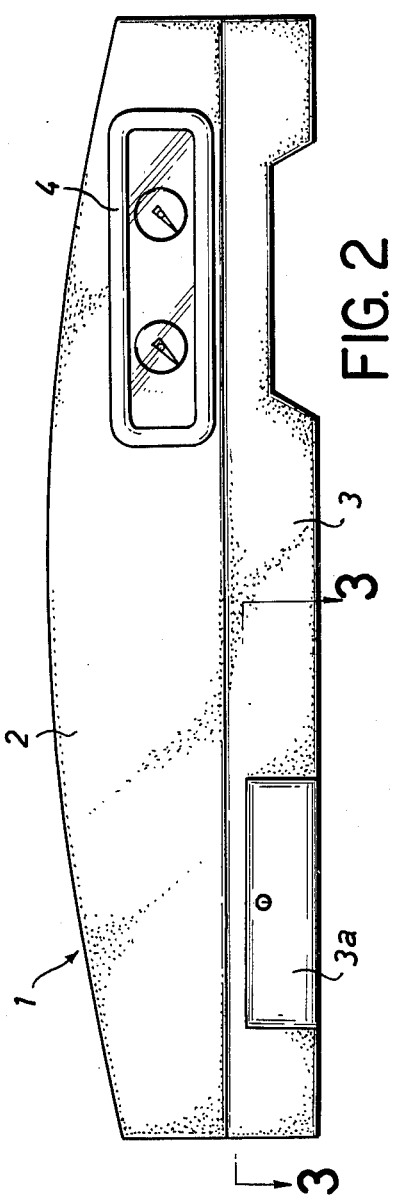

VEHICLE INSTRUMENT PANEL ATTACHING STRUCTURE

FIELD OF THE INVENTION

The present invention relates generally to an attaching structure for an instrument panel in a vehicle. More particularly, the invention relates to an instrument panel which is attached to a vehicle body frame so as to be yieldingly movable or displaceable relative to the vehicle body frame when subjected to impacts.

SUMMARY OF THE INVENTION

The present invention provides an attaching structure for an instrument panel in a vehicle which includes a body frame of a vehicle, an instrument panel, and at least one stay disposed at either side portion of the instrument panel. The stay connects the side portion of the instrument panel with the body frame of the vehicle such that a predetermined clearance is defined between the instrument panel and the body frame of the vehicle. The instrument panel includes an upper wall having a meter case mounted thereon, a lower wall extending substantially downwardly from the upper wall, and sidewalls adapted to be attached to the body frame of the vehicle. The lower wall of the instrument panel is provided with a slit at either side end thereof so as to partially provide a predetermined clearance between the lower wall and the sidewalls and substantially separate the lower wall from the sidewalls.

An object of the present invention is to provide a vehicle instrument panel attaching structure which can effectively absorb a substantial impact applied to the instrument panel under unusual conditions, such as during a collision, apart from an impact absorbing function of the instrument panel per se, in order to effectively protect a driver and/or passenger of the vehicle from injury.

Another object of the present invention is to provide a vehicle instrument panel attaching structure which can effectively accommodate thermal expansion of the instrument panel resulting from unusually high temperatures in the interior of the vehicle.

Still another object of the present invention is to provide a vehicle instrument panel attaching structure having a simplified construction and a minimal number of component parts.

In accordance with the present invention, an instrument panel is attached to a body frame of a vehicle by means of at least one stay which yields in response to relatively large forces, with a predetermined clearance being defined between the instrument panel and the body frame of the vehicle, whereby the instrument panel is movable or displaceable when subjected to impacts.

The above and further objects, features and advantages of the present invention will become apparent from the following detailed description when read in conjunction with the accompanying drawings.

BRIEF DESCRIPTION OF THE DRAWINGS

FIG. 1 is a perspective view of an instrument panel and associated components according to the invention, shown in a disassembled condition.

FIG. 2 is a schematic front view of the instrument panel shown in FIG. 1.

DETAILED DESCRIPTION OF PREFERRED EMBODIMENTS

Figure 3:
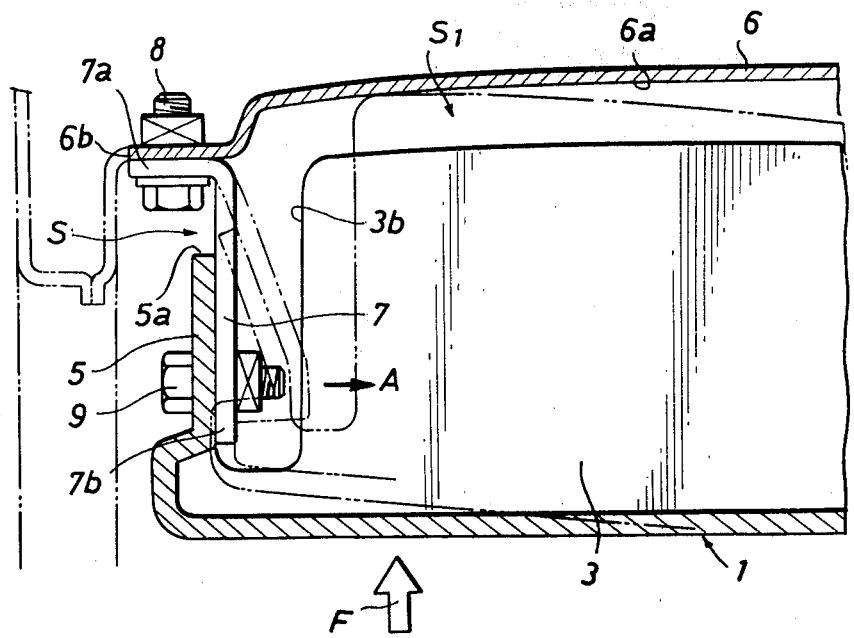
FIG. 3 is an enlarged partial sectional view of the instrument panel, taken along line 3—3 in FIG. 2.

With reference to FIGS. 1 and 2, there is shown an instrument panel 1 which extends transversely of a vehicle and includes an upper wall 2 having mounted thereon a meter case 4 in front of a driver's seat (not shown), a lower wall 3 which extends substantially downwardly from the upper wall 2 and is provided therein with a glove box 3a in front of a passenger's seat (not shown), and side walls 5 which may be employed for attaching the instrument panel 1 to a body frame 6 of the vehicle.

As shown in FIG. 3, the lower wall 3 of instrument panel 1 is provided with a slit 3b at either side end thereof adjacent to side walls 5, thereby partially providing a predetermined clearance between lower wall 3 and side walls 5 so as to substantially separate side walls 5 from lower wall 3.

Preferably, the instrument panel 1 is integrally formed of a synthetic resin material.

The body frame 6 of the vehicle includes a portion having a surface 6a extending transversely of the vehicle and facing the back surface of the instrument panel 1, and a surface 6b extending downwardly from either end of the surface 6a, for attaching thereto the instrument panel 1 by means of stays 7. Each of the stays 7 includes a flange-like base portion 7a extending substantially sidewardly from the main body of stay 7 including a distal end 7b as shown in FIG. 1, and the stays 7 are fabricated of a metal material which is substantially yieldable when subjected to relatively large forces.

Figure 4:
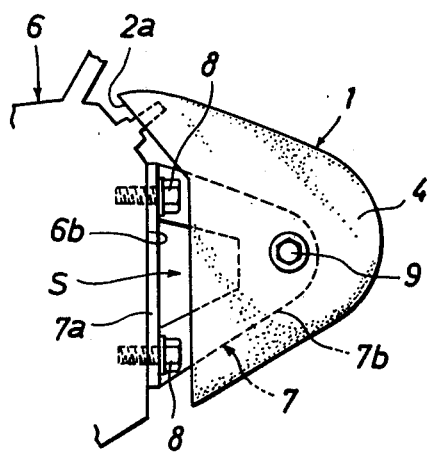
FIG. 4 is a side view of the instrument panel attached to a body frame of a vehicle, in accordance with the present invention.

As shown in FIGS. 3 and 4, each stay 7 is secured at the base portion 7a thereof to the surface 6b of the body frame 6 by a pair of bolts 8. The distal end 7b of each stay 7 is secured to one of the side walls 5 of instrument panel 1 by a bolt 9 in such a manner that the inner surface of the side wall 5 is in contact with the outer surface of the stay 7. In such arrangement, there is provided a predetermined clearance S defined between the base portion 7a of each stay 7 and a back end 5a of the corresponding side wall 5, and a clearance $S_1$ between the surface 6a of the body frame and a back end 2a of the upper wall 2 of the instrument panel 1.

With such arrangement in accordance with the invention, when the front surface of the instrument panel 1 is subjected to a substantial impact force F in substantially the longitudinal direction of the vehicle such that the panel 1 is pressed toward the front of the vehicle under unusual conditions such as during a collision, the force F will be divided in two transverse directions toward both side walls 5, and the thus divided forces will be transmitted to the stays 7. One of such divided forces will act upon the distal end 7b of one of the stays 7, such as for example the stay 7 on the left-hand side of the vehicle as shown in FIG. 3 which is disposed closer to the impact than the other stay 7, to force the end 7b thereof to move inwardly, i.e., in substantially the direction of arrow A. The other one of the divided forces will act on the other stay 7 (not shown) to force the end 7b thereof to move outwardly, but also in the direction of arrow A. As a result, the stays 7 will yield and buckle sidewardly in the direction of arrow A, for example, such that the instrument panel 1 will move in the direction of arrow A. Such yielding movements of the stays 7 take place relatively smoothly with the ends 7b of the stays being fixed to side walls 5, due to the aforesaid clearances defined by the slits 3b between the side walls 5 and the bottom wall 3. Such yielding movements of stays 7 continue until the instrument panel 1 comes into contact with the surface 6a of the body frame 6, with the clearance $S_1$ (FIG. 3) consumed. In this manner, the impact on the instrument panel 1 is effectively absorbed by way of the yielding movements of the stays 7.

From the foregoing description, it will be understood that the attaching structure of the instrument panel in accordance with the present invention can absorb a substantial impact to which the instrument panel is subjected, by virtue of the yieldable stays 7 and predetermined clearances described in detail hereinabove, and in cooperation with any yielding or breaking of the instrument panel per se, as required. A driver and/or passenger of the vehicle is thereby effectively protected from injury during a collision, for example.

It will be further understood that, with the arrangement in accordance with the present invention, thermal expansion of the instrument panel under unusually high temperature conditions in the interior of a vehicle can be effectively accommodated. Under such conditions, the distal ends 7b of the stays 7 will move outwardly as the sidewalls 5 are displaced outwardly due to thermal expansion of the instrument panel 1, with the base portion 7a of each stay 7 being fixed to the vehicle body frame 6. Such outward yielding movements of the stays 7 are afforded by the clearances defined by the slits 3b of the lower wall 3.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is inciated by the appended claims rather than by the foregoing description.

We claim:

1. In a vehicle including a body frame, an instrument panel comprising:
    an attaching structure which yieldably connects said instrument panel with a portion of said body frame;
    said attaching structure including at least one yieldable stay disposed at each side end portion of said instrument panel, each said stay being connected between said instrument panel and said body frame portion such that a predetermined clearance is defined between said instrument panel and said body frame portion; and
    each said stay being yieldably movable in substantially the transverse direction of said vehicle when said instrument panel is subjected to a substantial impact force, such that said substantial impact force is absorbed by said substantially transverse yielding movement of each said stay.

2. A vehicle instrument panel according to claim 1, wherein:
    said instrument panel includes an upper wall having a meter case mounted thereon, a lower wall extending substantially downwardly from said upper wall, and side walls adapted to be attached to said body frame of said vehicle; and
    said lower wall of said instrument panel is provided with a slit at either side end thereof adjacent to said side walls so as to partially provide a predetermined clearance between said lower wall and said side walls and substantially separate said lower wall from said side walls.

3. A vehicle instrument panel according to claim 2, wherein:
    each said stay is fastened at the distal end thereof to one of said side walls of said instrument panel and at a base portion thereof to said body frame of said portion of said vehicle.

4. A vehicle instrument panel according to claim 3, wherein:
    said distal end of said stay is fastened to said side wall such that the inner surface of said side wall is in contact with the outer surface of said stay.

5. A vehicle instrument panel according to claim 3, wherein:
    said base portion of said stay has a flange-like configuration and is bent substantially sidewardly with respect to the main body of said stay.

6. A vehicle instrument panel according to claim 1, wherein:
    each said stay is yieldably movable in said transverse direction of said vehicle to the extent that said predetermined clearance is consumed and said instrument panel comes into contact with said body frame portion of said vehicle.

7. A vehicle instrument panel according to claim 1, wherein:
    said instrument panel is substantially integrally formed of a synthetic resin material.

8. A vehicle instrument panel according to claim 1, wherein:
    said portion of said body frame extends substantially transversely of said vehicle.

* * * * *